(12) United States Patent
Rodriguez et al.

(10) Patent No.: US 12,114,080 B2
(45) Date of Patent: Oct. 8, 2024

(54) DISPLAY SCREEN FLICKER DETECTION

(71) Applicant: Ford Global Technologies, LLC, Dearborn, MI (US)

(72) Inventors: Ivan Abel Rodriguez, Azcapotzalco/Ciudad de Mexico (MX); Enrique Gonzalez, Lomas de Tecamachalco/Estado de México (MX)

(73) Assignee: Ford Global Technologies, LLC, Dearborn, MI (US)

( * ) Notice: Subject to any disclaimer, the term of this patent is extended or adjusted under 35 U.S.C. 154(b) by 130 days.

(21) Appl. No.: 18/047,057

(22) Filed: Oct. 17, 2022

(65) Prior Publication Data

US 2024/0129637 A1    Apr. 18, 2024

(51) Int. Cl.
*G09G 3/00* (2006.01)
*G06V 10/25* (2022.01)
*G06V 10/75* (2022.01)
*H04N 23/745* (2023.01)

(52) U.S. Cl.
CPC ............ *H04N 23/745* (2023.01); *G06V 10/25* (2022.01); *G06V 10/751* (2022.01); *G09G 3/006* (2013.01); *G09G 2320/0247* (2013.01)

(58) Field of Classification Search
CPC ...................................................... G09G 3/006
USPC ................................................... 348/207.99
See application file for complete search history.

(56) References Cited

U.S. PATENT DOCUMENTS

| | | | |
|---|---|---|---|
| 9,514,664 B2 | 12/2016 | Blanton et al. | |
| 10,573,074 B1 | 2/2020 | Bull et al. | |
| 2003/0214586 A1* | 11/2003 | Lee | H04N 17/04 348/E17.005 |
| 2013/0265345 A1* | 10/2013 | Krig | G09G 3/36 345/87 |
| 2014/0175163 A1* | 6/2014 | Tankleff | G09G 3/006 235/375 |
| 2014/0210841 A1* | 7/2014 | Song | G09G 3/36 345/589 |
| 2019/0147781 A1* | 5/2019 | Park | G09G 3/2007 345/691 |
| 2019/0340739 A1* | 11/2019 | An | G06T 7/001 |

FOREIGN PATENT DOCUMENTS

| | | |
|---|---|---|
| KR | 19970048703 A | 7/1997 |
| KR | 101953325 B1 | 2/2019 |
| KR | 1020200445646 A | 5/2020 |

* cited by examiner

*Primary Examiner* — Anthony J Daniels
(74) *Attorney, Agent, or Firm* — Christopher Storms; Bejin Bieneman PLC

(57) ABSTRACT

When multiple display screens share data from different control units, the screens may flicker or have other anomalies when the control units are not synced. A system and method for detecting flickering or other anomalies includes receiving a video feed of a display screen to be tested, recording, from the video feed, a video file of a predetermined length that includes a plurality of frames, selecting a region of interest in a frame of the video file to define a template image; and performing a pattern matching between the template image and a pattern image of respective frames in the video file to detect anomalies.

20 Claims, 3 Drawing Sheets

DISPLAY SCREEN FLICKER DETECTION

BACKGROUND

Vehicles such as ground vehicles are increasingly using display screens for instrument panel clusters (IPCs) and human-machine interfaces (HMIs) used for media control, environmental control (e.g., HVAC), system settings, etc., herein referred to as an in-vehicle infotainment (IVI) screen.

DETAILED DESCRIPTION

Figure 1:
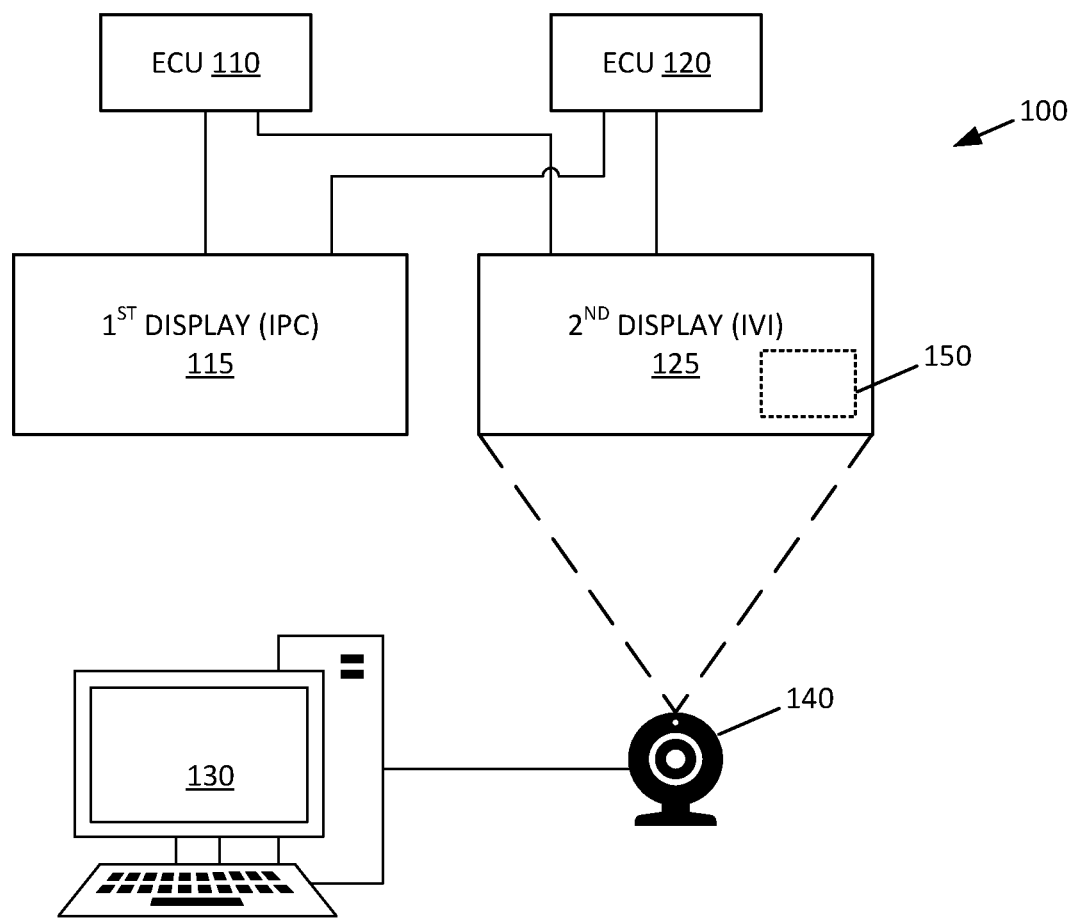
FIG. 1 illustrates a schematic diagram of an example system for display screen anomaly detection.

The different display screens of an IPC and an IVI screen are often controlled by different electronic control units (ECUs). When information is shared between the different display screens of an IPC and an IVI screen from the different ECUs, an insufficient synchronization between the ECUs may cause flickering or other anomalies on a display screen of one or both of the IPC and the IVI screen. As used herein, an "anomaly" refers to a missing element, brightness change, color change, and the like that are unintended, and "flickering" refers to a particular anomaly caused by any loss of a user interface (UI) element during regular operation of the screen, i.e., an event in which some or all of an element (or elements) to displayed on the screen disappears or is not displayed.

While basic operation of the screens may be tested during assembly, if flickering or other anomalies only occur intermittently, the issue may not be discovered during manufacture of the vehicle.

In accordance with the present disclosure, a video feed and a computer executing multiple threads may be used to efficiently perform testing of a display for flickering or other anomalies over an extended period of time. The testing may be performed using common equipment such as a personal computer and a web cam, and may take place, for example, over a weekend. Pattern matching is used to compare a template image to pattern image of the frames to detect flickering and other anomalies. If any flickering or other anomaly is detected in a display, the ECU of the display may be reprogrammed to address the issue. As used herein a "thread" refers to a context of execution for a task that is given its own call stack so as to be able to run simultaneously with other threads on a processor. As used herein, a "template image" is an image that the pattern matching algorithm expects to find, i.e., the image to which the others are compared, and a "pattern image" is the image that is compared to the template image, i.e., the image that is being tested. If the template image is within a portion of the pattern image, a match will be found. A coefficient of match output by the pattern matching algorithm is then based on how closely the pattern image resembles the template image.

In one or more implementations of the present disclosure, a system has a computer including a processor and a memory, the memory storing instructions executable by the processor programmed to: receive a video feed of a display screen to be tested; record, from the video feed, a video file of a predetermined length including a plurality of frames; select a region of interest in a frame of the video file to define a template image; and perform a pattern matching between the template image and a pattern image of respective frames in the video file to detect anomalies.

In an implementation, the system may further include instructions to define a test length.

In another implantation, the test length may be divided into a plurality of the predetermined lengths of the video file, the instructions to record the video file may include instructions to record a plurality of video files in a first thread, and the instructions to perform the pattern matching performs the pattern matching on respective frames of a first video file in a second thread during recording of a second video file in the first thread.

In an implementation, the instructions to perform the pattern matching on respective frames may include instructions to perform the pattern matching on each frame of the video file.

In another implementation, the instructions to perform the pattern matching may determine a match coefficient for each frame and store values of the match coefficients for the video file. This implementation may further include instructions to, upon completion of pattern matching on a video file: define an anomaly threshold as a difference between a mode and statistical measure of the stored match coefficient values for the video file; and determine an anomaly based upon the match coefficient of a frame being less than the anomaly threshold.

This implementation may further include instructions to store a timestamp of the frame determined as having an anomaly.

In an implementation having a plurality of video files, the instructions to perform the pattern matching on respective frames may include instructions to: perform the pattern matching on each frame of the video file; determine a match coefficient for each frame; and store the match coefficients for the video file.

An implementation may further include instructions to, upon completion of pattern matching on a video file: define an anomaly threshold as a difference between a mode and statistical measure of the stored match coefficient values for the video file; and determine an anomaly based upon the match coefficient of a frame being less than the anomaly threshold.

Another implementation may further include instructions to store a timestamp of the frame determined as having an anomaly.

In one or more implementations of the present disclosure, a method may include: receiving a video feed of a display screen to be tested; recording a predetermined length of the video feed as a video file including a plurality of frames; selecting a region of interest in a frame of the video file to define a template image; and performing a pattern matching between the template image and a pattern image of respective frames in the video file to detect anomalies.

An implementation may further include defining a test length.

Another implementation may further include: dividing the test length into a plurality of the predetermined lengths of the video file; recording a plurality of video files sequentially in a first thread executing on a computer; and performing the pattern matching on the respective frames of a first video file in a second thread executing on the computer during recording of a second video file in the first thread.

In an implementation, the pattern matching may be performed on each frame of the video file.

In an implementation, the pattern matching may determine a match coefficient for each frame and store values of the match coefficients for the video file.

An implementation may further include, upon completion of pattern matching on a video file: defining an anomaly threshold as a difference between a mode and a statistical measure of the stored match coefficient values for the video file; and determining an anomaly based upon the match coefficient of a frame being less than the anomaly threshold.

An implementation may further include storing a timestamp of the frame determined as having an anomaly.

In another implementation, performing the pattern matching may include: performing the pattern matching on each frame of the video file; determining a match coefficient for each frame; and storing the match coefficients for the video file.

An implementation may further include, upon completion of pattern matching on a video file: defining an anomaly threshold as a difference between a mode and a statistical measure of the stored match coefficient values for the video file; and determining an anomaly based upon the match coefficient of a frame being less than the anomaly threshold.

Another implementation may further include storing a timestamp of the frame determined as having an anomaly.

While described below with respect to flickering, the methods systems and methods further apply to detecting other anomalies as well. For ease of description, only flickering will be described relative to the drawing Figures for flickering and other anomalies.

With reference to FIG. 1, a schematic diagram of an example system 100 for display screen flicker detection is illustrated.

A first display screen 115, such as for an instrument panel cluster (IPC), may be controlled by an electronic control unit (ECU) 110 or the like, and a second display screen 125, such as for an in-vehicle infotainment (IVI) screen, may be controlled by an ECU 120 or the like. As shown by the connections, some of the data from ECU 110 may also be displayed on the second display screen 125, and some of the data from ECU 120 may be displayed on first display screen 115. During operation of the first and second display screens 115 and 125, if the ECUs 110 and 120 are not synchronized (i.e., have a "loss of lock"), screen flickering may occur. Improper ECU programming may cause a loss of lock, so reprogramming the ECU may address the issue.

To perform an extended test of a display screen to check for flickering, a video camera 140 may capture video images of the display screen being tested. In this example, video camera 140 is shown as a web cam, and the display screen being tested is the second display 125, which is shown as an IVI screen. An inexpensive video camera such as a web cam may be used since it has sufficient resolution to capture an image of a region of interest 150 displayed by the display screen being tested, may operate at frame rates between 30 fps and 60 fps, and uses codecs that permit compact storage of video files. For example, a 3-megapixel image may be captured at 30 fps using MPEG-4 to store one hour video files on the order of 9 to 10 GBs with a Logitech C930e web cam. In an implementation, the region of interest 150 may be an area of the display selected based on diagnostics or other specific conditions related to the display of shared data.

In other examples, the first display screen 115, shown as an IPC, can be the display screen being tested. In a further implementation, a second web cam may be used to capture video images of the other display screen so as to test both display screens at the same time. For ease of description, testing of only one of the screens will be described.

The video images captured by video camera 140 are sent to a computer 130, which in this example is illustrated as a personal computer. While many suitable computing devices may be used, the computer 130 in one implementation can be an Intel Xeon E52630 v3 operating at 2.4 GHz, having 8 GB of RAM and a 500 GB SSD, and running Windows 10 Enterprise 64-bit. Such processing capabilities are sufficient for storing the video files and executing the multiple threads as discussed in further detail below.

Figure 2:
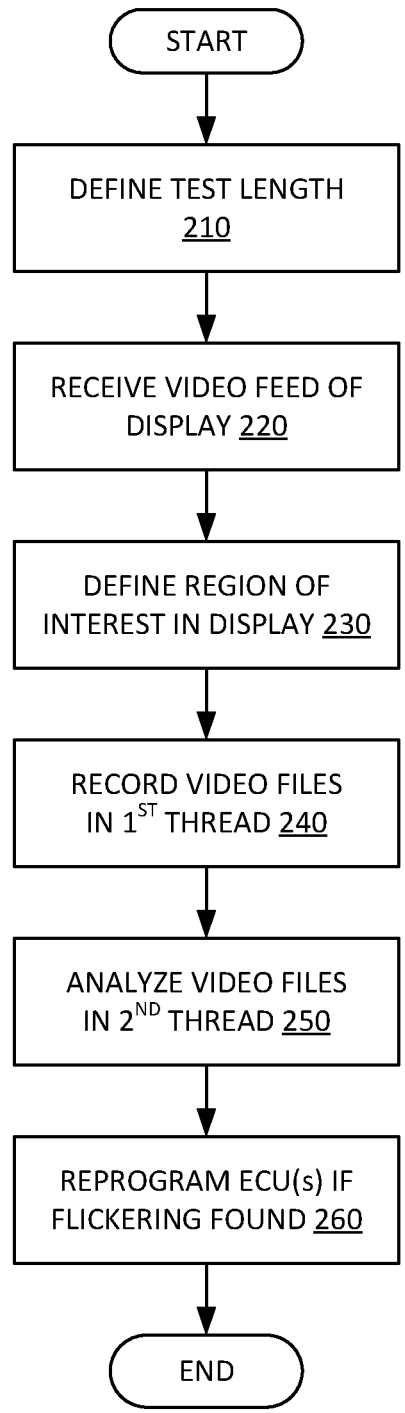
FIG. 2 illustrates an example flow diagram of a method for detecting flickering and addressing the flickering if detected.

With reference to FIG. 2, an example flow diagram of a testing method 200 for detecting flickering and addressing the flickering is illustrated.

In a first block 210, a program executing on computer 130 may be used to define a length of the test. The length of the test may be hard-coded, selected from a pull-down menu, or input into a GUI of the program. In one implementation of the present disclosure, the test length was defined as 65 hours. Generally, approximately 65 hours has been found to be a workable length of a test time. A minimum test time, e.g., to detect at least severe flicker cases, could be as low as six hours, and moreover, test times over 100 hours provide diminishing returns. Testing lengths may vary between 6 and 100 hours, with lengths of 12, 24, 48, and 65 hours being typical examples. With additional data collection and statistical analysis, it may be possible to determine shorter testing lengths for particular systems that are sufficient to capture the vast majority of defective units.

In block 220, the computer 130 receives a video feed of the display being tested from video camera 140. A video feed means a sequence or stream of data that includes a plurality of frames of video data. In an implementation, the video feed may be an MPEG-4 stream of 1920×1080 pixel (1080p) frames at 30 frames per second (fps).

In a next block 230, a region of interest 150 in the display being tested may be defined in the video. Defining a region of interest 150 permits the method to operate faster than if carried out for an entire screen (since the region being compared will have fewer pixels), permits selection of UI elements that are of concern (e.g., that may have flickered in prior units), and permits selection of UI elements that remain relatively static (i.e., do not feature animation or do not change) for easier comparison over time.

In block 240, a first thread executing on computer 130 is used to record video files of a fixed length, i.e., a set of frames of a predetermined data size, a predetermined number, or for a predetermined time. For example, one-hour segments of 1080p MPEG-4 video at 30 fps may be saved to a memory device of computer 130 as video 9-10 GB video files.

In block 250, a second thread executing on computer 130 is used to analyze each of the video files using pattern matching. This analysis for each of the video files may be performed as soon as the video file is saved in block 240 so that analysis of captured video may be performed simultaneously in the second thread with the continuing video capture being performed in the first thread. Details of the analysis performed on each video file with the second executing thread are discussed below with respect to FIG. 3.

Then, in block 260, if flickering is detected, the test data may be used to troubleshoot the problem and reprogram the ECU of the display being tested.

Figure 3:
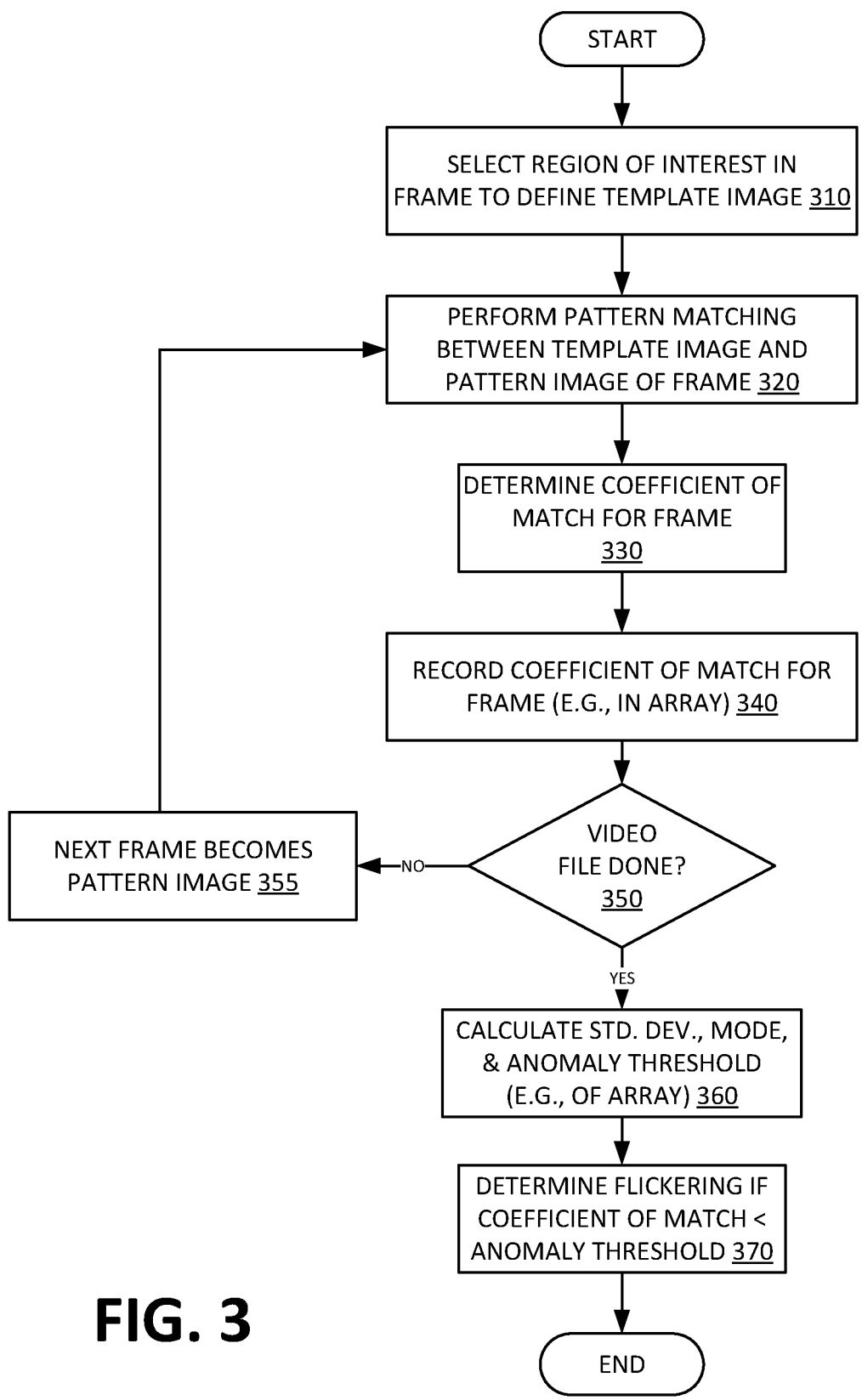
FIG. 3 illustrates an example flow diagram of an analysis performed by a second thread.

With reference to FIG. 3, an example flow diagram of a method 300 performed by the second thread is illustrated. As used herein, image frames from captured video files will be referred to as frames.

In a first block 310, a region of interest 150 is selected in a frame of a properly operating display to define a template image that will be used for the pattern matching of the second thread executing on computer 130 to check for flickering. This may be performed within the second thread or prior to execution of the second thread. If there are changes in the display because of a failure to display a UI element in the region of interest that occurs during flickering, the changes may be detected by a comparison of the template image with the region of interest in the pattern image each frame.

In a next block 320, the second thread executing on the computer 130 performs a pattern matching operation between the template image and the pattern image of the frame in order to detect possible changes due to flickering. In an implementation, pattern matching of the template image and the pattern image is performed with a Python script using the OpenCV Template Matching method. However, numerous other known template matching algorithms using cross correlation, sum of absolute differences, etc. may be used without departing from the present disclosure.

In block 330, a coefficient of match (or "match coefficient") is determined for the template image within the pattern image of the frame based upon the output of the pattern matching operation. Such a coefficient may vary between 0 (for no match) and 1 (for a full match) or may be a percentage between 0% and 100%. In an implementation using the OpenCV Template Matching script, a match certainty coefficient is obtained as a percentage and is considered the match coefficient as used herein.

In a next block 340, the coefficient of match value for the frame is stored, such as by being recorded in an array on the memory device of computer 130.

In block 350, the second thread executing on the computer 130 determines whether the pattern matching has been performed for all frames in the video file being analyzed.

If pattern matching has not been performed for all frames in the video file being analyzed ("NO" at block 350), the method moves to block 355, wherein a next frame becomes the pattern image to be fed into the pattern matching of block 320.

If pattern matching has been performed for all frames in the video file being analyzed ("YES" at block 350), the process moves to block 360.

In block 360, the second thread executing on the computer 130 calculates a standard deviation (std) for the stored coefficient of match values, such as the values stored in the array in the example above, and calculates a mode for the values. The second thread executing on the computer 130 then subtracts a statistical measure from the mode to calculate an anomaly threshold. In an implementation, UI elements being displayed may be updated with new values during the testing (e.g., song titles may change, temperature displays may update, time displays will update, etc.) and such changes should not be considered to be flickering such as that due to the failure of a UI element to be displayed. In an implementation, it has been found that a statistical measure of three (3) standard deviations from the mode (i.e., mode−3*std) is sufficient to detect an anomaly, such as a flicker due to the loss of a UI element, without generating false positives of changes from UI elements being updated on the display.

Then, at block 370, the value of the coefficient of match for each frame is compared to the anomaly threshold determined in the second thread executing on the computer 130, and if the value is less than the anomaly threshold, the frame is determined to be flickering and a timestamp of the frame is recorded for analysis and troubleshooting purposes.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor programmed to:
   receive a video feed of a display screen to be tested;
   record in a first thread, from the video feed, a plurality of video files of a predetermined length including a plurality of frames;
   define a test length that is divided into a plurality of the predetermined lengths of the video file;
   select a region of interest in a frame of the video file to define a template image; and
   perform a pattern matching between the template image and a pattern image of respective frames of a first video file in a second thread during recording of a second video file in the first thread to detect anomalies.

2. The system of claim 1, wherein the instructions to perform the pattern matching on respective frames include instructions to perform the pattern matching on each frame of the video file.

3. The system of claim 2, wherein the instructions to perform the pattern matching determine a match coefficient for each frame and store values of the match coefficients for the video file.

4. The system of claim 3, further comprising instructions to, upon completion of pattern matching on a video file:
   define an anomaly threshold as a difference between a mode and statistical measure of the stored match coefficient values for the video file; and
   determine an anomaly based upon the match coefficient of a frame being less than the anomaly threshold.

5. The system of claim 4, further comprising instructions to store a timestamp of the frame determined as having an anomaly.

6. The system of claim 1, wherein the instructions to perform the pattern matching on respective frames include instructions to:
   perform the pattern matching on each frame of the video file;
   determine a match coefficient for each frame; and
   store the match coefficients for the video file.

7. The system of claim 6, further comprising instructions to, upon completion of pattern matching on a video file:
   define an anomaly threshold as a difference between a mode and statistical measure of the stored match coefficient values for the video file; and
   determine an anomaly based upon the match coefficient of a frame being less than the anomaly threshold.

8. The system of claim 7, further comprising instructions to store a timestamp of the frame determined as having an anomaly.

9. A method, comprising:
   receiving a video feed of a display screen to be tested;
   sequentially recording, in a first thread executing on a computer, a predetermined length of the video feed as a plurality of video files including a plurality of frames;
   defining a test length that is divided into a plurality of the predetermined lengths of the video file;
   selecting a region of interest in a frame of the video file to define a template image; and
   performing a pattern matching between the template image and a pattern image of respective frames of a first video file in a second thread executing on the computer during recording of a second video file in the first thread to detect anomalies.

10. The method of claim 9, wherein the pattern matching is performed on each frame of the video file.

11. The method of claim 10, wherein the pattern matching determines a match coefficient for each frame and stores values of the match coefficients for the video file.

12. The method of claim 11, further comprising, upon completion of pattern matching on a video file:
   defining an anomaly threshold as a difference between a mode and a statistical measure of the stored match coefficient values for the video file; and determining an anomaly based upon the match coefficient of a frame being less than the anomaly threshold.

13. The method of claim 12, further comprising storing a timestamp of the frame determined as having an anomaly.

14. The method of claim 9, wherein performing the pattern matching includes:
performing the pattern matching on each frame of the video file;
determining a match coefficient for each frame; and
storing the match coefficients for the video file.

15. The method of claim 14, further comprising, upon completion of the pattern matching on a video file:
defining an anomaly threshold as a difference between a mode and a statistical measure of the stored match coefficient values for the video file; and
determining an anomaly based upon the match coefficient of a frame being less than the anomaly threshold.

16. The method of claim 15, further comprising storing a timestamp of the frame determined as having an anomaly.

17. A system, comprising a computer including a processor and a memory, the memory storing instructions executable by the processor programmed to:
receive a video feed of a display screen to be tested;
record in a first thread, from the video feed, a plurality of video files of a predetermined length including a plurality of frames;
define a test length that is divided into a plurality of the predetermined lengths of the video file;
select a region of interest in a frame of the video file to define a template image;
perform a pattern matching between the template image and a pattern image on each of respective frames of a first video file in a second thread during recording of a second video file in the first thread to detect anomalies;
determine a match coefficient for each frame; and
store the match coefficients for the video file.

18. The system of claim 17, further comprising instructions to, upon completion of pattern matching on a video file:
define an anomaly threshold as a difference between a mode and statistical measure of the stored match coefficient values for the video file; and
determine an anomaly based upon the match coefficient of a frame being less than the anomaly threshold.

19. The system of claim 18, further comprising instructions to store a timestamp of the frame determined as having an anomaly.

20. The system of claim 17, wherein the instructions to perform the pattern matching on respective frames include instructions to perform the pattern matching on each frame of the video file.

* * * * *